United States Patent [19]

Moffatt

[11] Patent Number: 5,133,803

[45] Date of Patent: * Jul. 28, 1992

[54] HIGH MOLECULAR WEIGHT COLLOIDS WHICH CONTROL BLEED

[75] Inventor: John R. Moffatt, Corvallis, Oreg.

[73] Assignee: Hewlett-Packard Company, Palo Alto, Calif.

[ * ] Notice: The portion of the term of this patent subsequent to Apr. 21, 2009 has been disclaimed.

[21] Appl. No.: 737,101

[22] Filed: Jul. 29, 1991

[51] Int. Cl.$^5$ .............................................. C09D 11/14
[52] U.S. Cl. ........................................ 106/25; 106/22
[58] Field of Search ...................... 106/20, 22, 23, 25

[56] References Cited

U.S. PATENT DOCUMENTS

| | | | |
|---|---|---|---|
| 2,771,374 | 11/1956 | Chambers et al. | 106/25 |
| 2,868,741 | 1/1959 | Chambers et al. | 106/25 |
| 4,310,356 | 1/1982 | Trubiano et al. | 106/25 |
| 4,388,115 | 6/1983 | Sugiyama et al. | 106/22 |
| 4,425,162 | 1/1984 | Sugiyama et al. | 106/22 |
| 4,512,807 | 4/1985 | Ogawa et al. | 106/22 |
| 4,671,691 | 6/1987 | Case et al. | 106/25 |
| 4,881,084 | 11/1989 | Kan et al. | 106/25 |
| 4,920,361 | 4/1990 | Arahara et al. | 106/20 |
| 4,962,389 | 10/1990 | Kan et al. | 106/20 |
| 5,017,223 | 5/1991 | Kobayashi et al. | 106/22 |

Primary Examiner—Karl Group
Assistant Examiner—Helene Klemanski

[57] ABSTRACT

Color bleed (the invasion of one color into another on the surface of the print medium) using ink-jet inks is controlled by employing high molecular weight colloids, such as alginates, in conjunction with amphoteric surfactants and/or non-ionic amphiphiles. The inks of the invention comprise a vehicle and a dye. The vehicle typically comprises a low viscosity, high boiling point solvent, one or two surfactants at concentrations above their critical micelle concentration (cmc), while the dye typically comprises any of the dyes commonly employed in ink-jet printing. The amount of surfactant is described in terms of its critical micelle concentration (cmc), which is a unique value for each surfactant system. Above the cmc, colloidal species form, which attract the dye molecules and thus control the color bleed. Below the cmc, there is no colloid, and thus poor control of the color bleed results. Also, the presence of the high molecular weight colloid further improves the text print quality and renders sharper definition among colors printed adjacent one another.

30 Claims, 3 Drawing Sheets

HIGH MOLECULAR WEIGHT COLLOIDS WHICH CONTROL BLEED

TECHNICAL FIELD

The present invention relates to inks employed in ink-jet printing, especially in thermal ink-jet printing, and, more particularly, to colored ink compositions in which color bleed is substantially reduced or even eliminated.

BACKGROUND ART

Heavy dye loads on bond paper of various colored inks can lead to bleed and reduction of waterfastness. Bleed, as used herein, is the invasion of one color into another color on paper, which is a surface phenomenon. This is in contradistinction to uses of the term in the prior art, which tend to define "bleed" in the context of ink of a single color following the fibers of the paper; this is a sub-surface phenomenon.

Surfactants have been used as anti-clogging agents in Japanese Laid-Open Patent Application No. 63-165465 for use in ink-jet recording inks. The surfactants used in that application are limited to those having a surface tension between 20 and 50 dyne/cm. The amount of surfactant ranges from about 0.5 to 25 wt%. Specific examples disclosed include sodium dodecyl benzene sulfonate, sodium laurate, and polyethylene glycol monooleyl ether.

Japanese Laid-Open Patent Application No. 01-203,483 is directed to ink-jet recording compositions. Bleed reduction is mentioned in connection with printing using the inks. However, the compositions require pectin (0.01 to 2 wt%). However, pectin is not useful in inks used in thermal ink-jet printers, due to its thermal instability (it gels at higher temperatures).

Japanese Patent JO 1215-875-A is directed to inks suitable for ink-jet printing, evidencing good recording with fast drying without bleeding. The compositions all require triglycerides. Such compounds, however, are not stable to extended shelf life necessary for commercial inks.

Japanese Patent JO 1230-685-A is directed to inks suitable for ink-jet printing, evidencing quick absorption on the surface of conventional office paper without smear or blotting. The compositions comprise colorants and liquid solvents and/or dispersants and are characterized by the presence of a copolymer of ethylene oxide and propylene oxide of the formula $HO(C_2H_4O)_a-C_3H_6O(C_2H_4O)_bH$, where a+b is up to 50 and b is optionally 0. These copolymers are referred to as "PLURONICS". For the most part, they have not been found to stop bleed.

Thermal ink-jet printers offer a low cost, high quality, and comparatively noise-free option to other types of printers commonly used with computers. Such printers employ a resistor element in a chamber provided with an egress for ink to enter from a plenum. The plenum is connected to a reservoir for storing the ink. A plurality of such resistor elements are arranged in a particular pattern, called a primitive, in a printhead. Each resistor element is associated with a nozzle in a nozzle plate, through which ink is expelled toward a print medium. The entire assembly of printhead and reservoir comprise an inkjet pen.

In operation, each resistor element is connected via a conductive trace to microprocessor, where current-carrying signals cause one or more selected elements to heat up. The heating creates a bubble of ink in the chamber, which is expelled through the nozzle toward the print medium. In this way, firing of a plurality of such resistor elements in a particular order in a given primitive forms alphanumeric characters, performs area-fill, and provides other print capabilities on the medium.

Many inks that are described for use in ink-jet printing are usually associated with non-thermal ink-jet printing. An example of such non-thermal ink-jet printing is piezoelectric ink-jet printing, which employs a piezoelectric element to expel droplets of ink to the medium. Inks suitably employed in such non-thermal applications often cannot be used in thermal ink-jet printing, due to the effect of heating on the ink composition.

A need remains for ink compositions for use in ink-jet printing, particularly thermal ink-jet printing, which do not evidence bleed, as defined herein, and yet which possess relatively long shelf life and other desirable properties of such inks.

DISCLOSURE OF INVENTION

In accordance with the invention, ink compositions are provided in which bleed is controlled. The ink compositions comprise (a) about 0.05 to 0.75 wt% of a high molecular weight colloid, (b) at least one zwitterionic (amphoteric) surfactant and/or a non-ionic amphiphile, present in at least its minimum micelle concentration, as defined herein, (c) about 0.5 to 20 wt% of one or more low vapor pressure solvents, (d) one or more water-soluble dyes, and (e) water. The inks also include one or more biocides, fungicides, and/or slimicides, as is commonly practiced in the art.

The inks of the invention evidence little or no color bleed, even with the heaviest printing mode, dot-on-dot, and an enhanced color gamut.

BEST MODES FOR CARRYING OUT THE INVENTION

Figure 1:
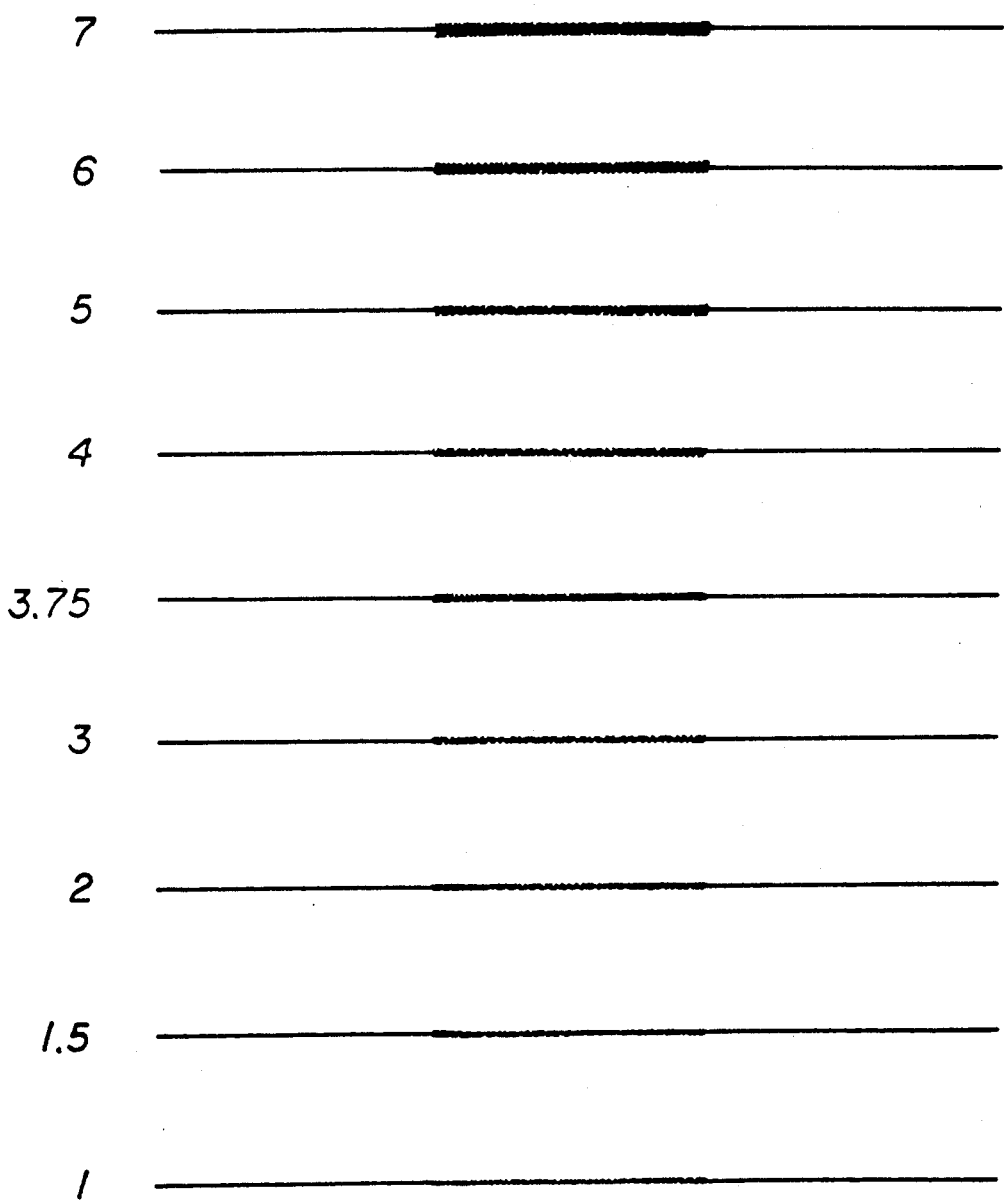
FIG. 1 shows bleed reference patterns where higher bleed indices reflect unacceptable bleed (a bleed score of $\leq 2.5$ is considered to be acceptable for high quality text output)

In accordance with the invention, ink compositions are provided in which bleed is controlled. The ink compositions comprise (a) about 0.05 to 0.75 wt% of a high molecular weight colloid, (b) at least one zwitterionic (amphoteric) surfactant and/or a non-ionic amphiphile, (c) about 0.5 to 20 wt% of one or more low vapor pressure solvents, (d) one or more water-soluble dyes, and (e) the balance water. The inks also include one or more biocides, fungicides, and/or slimicides, as is commonly practiced in the art.

Further, the ink may contain a bile salt, such as sodium cholate, for controlling kogation in ink-jet inks used in thermal ink-jet printers, to prevent the build-up of residues (koga) on the surfaces of the resistors used to fire droplets of ink toward a print medium. The use of bile salts in such inks is disclosed and claimed in application Serial No. 07/724,649, filed Jul. 2, 1991 by John R. Moffatt, entitled "Bile Salts Which Control Kogation in Thermal Ink-Jet Inks", and assigned to the same assignee as the present application.

All concentrations herein are in weight percent, unless otherwise indicated. The purity of all components is that employed in normal commercial practice for thermal ink-jet inks.

As used herein, the term "low vapor pressure solvent" refers to a solvent having a vapor pressure that is lower than that of water and the term "water-soluble dye" refers to a dye whose solubility in water exceeds 2 wt%.

Low vapor pressure solvents can include, but are not restricted to, glycols such as ethylene glycol, diethylene glycol, triethylene glycol, tetraethylene glycol, propylene glycol, polyethylene glycol, polypropylene glycol, and derivatives thereof; diols such as butanediol, pentanediol, hexanediol, and homologous diols; glycol esters such as propylene glycol laurate; mono and di glycol ethers such as cellosolves, including ethylene glycol monobutyl ether, diethylene glycol ethers such as the carbitols, diethylene glycol mono ethyl, butyl, hexyl ethers, propylene glycol ether, dipropylene glycol ether, and triethylene glycol ether; long chain alcohols such as butyl alcohol, pentyl alcohol, and homologous alcohols; and other solvents such as sulfolane, esters, ketones, lactones such as γ-butyrolactone, lactams such as N-pyrrolidone, 2-pyrrolidone, and N-(2-hydroxyethyl) pyrrolidone, and glycerols and their derivatives.

Preferably, the solvent comprises pentanediol, most preferably 1,5-pentanediol. Other organic solvents commonly employed in thermal ink-jet printing, such as diethylene glycol, have not been found to be as effective as pentanediol.

The concentration of the pentanediol ranges from about 4 to 15 wt%. Less than about 4% results in long term crusting of the ink at the printhead nozzles, while greater than about 15% results in an ink that is too viscous to be jetted. Preferably, the concentration of pentanediol ranges from about 5 to 9 wt%, and most preferably is about 8 wt%.

Microbial reagents include, but are not limited to, NUOSEPT (Nudex, Inc., a division of Huls Americal, UCARCIDE (Union Carbide), VANCIDE (RT Vanderbilt Co.), and PROXEL (ICI Americas).

Dyes include, but are not limited to, anionic water-soluble types such as C.I. Acid Blue 9 (#42090), C.I. Acid Red 18 (#18), C.I. Acid Red 27 (#16185), C.I. Acid Red 52 (#45100), C.I. Acid Yellow 23 (#19140), C.I. Direct Blue 199 (#74190), C.I. Direct Yellow 86 (#29325) and their monovalent alkali earth ions such as Na+, Li+, Cs+, NH4+, and substituted ammonium salts. The dye(s) is present from about 0.1 to 10 wt% of the ink.

In the practice of the invention, color bleed resulting from the use of ink-jet inks in thermal ink-jet printers is alleviated by employing a combination of high molecular weight colloids and at least one amphoteric surfactant. As used herein the term "high molecular weight colloid" refers to a colloid having a molecular weight of at least about 10,000.

The large polysaccharides (colloids) disclosed herein for use in thermal ink-jet printing are effective at about 0.05 to 0.75 wt% in alleviating bleed. At levels much higher than this, the viscosity of the ink is too high to jet from a pen.

Apparently, these polysaccharides aggregate to form large molecular clusters. This is particularly so for the alginates. Because of this behavior, they are also commonly classified as surfactants; however, as used herein, these polysaccharide surfactants are considered apart from amphoteric surfactants, which are also included in ink compositions.

The colloids used in the practice of the invention include colloids derived from natural sources, such as salts of alginic acid, mannomuronic acid, carrageenan (such as the hot water extract of marine algae *Chondrus crisous* or *Rhodoohvceae*), guar and xanthan gums, dextran, chitin, and chitosan. In addition, synthetic colloids, such as carboxymethylcellulose, may be employed in the practice of the invention.

Alginates are naturally occurring block copolymers of the salts of L-guluronic acid and D-mannuronic acid. They are isolated from several varieties of seaweed, notably *Macrocystis pyrifera*. Typical analysis gives 5.5% sodium, 2% calcium, and 9.5% potassium as the principal counter-ions, along with trace amounts of other mono- and di-valent cations, which is known as "sodium" alginate.

Carrageenans are water-soluble, cell wall polysaccharides isolated from *Rhodophyceae*. Three usual forms exist: the kappa, iota, and lambda forms. The kappa and iota forms exist as right handed double helices, while the lambda form has a much less rigid structure. All three polymers interact to form carrageenan. Typical molecular weight ranges of carrageenan are from about 300,000 to 500,000.

Guar gums isolated from several sources give highly variable structures. They consist mostly of galactomannosan residues with small quantities of protein and oil. Estimates of average molecular weight range from about 500,000 to 2,000,000. Many guar gums are polydisperse.

Xanthan gums have a structure consisting of five repeating sugar residues: two glucose, one mannose, and one guluronic acid. The polymer consists essentially of a cellulose backbone. A trisaccharide side chain on alternating sugar residues of the backbone distinguishes xanthan gums from cellulose. Several X-ray structures show that xanthan gums consist of several entwined polymer chains.

Carboxymethylcellulose (low molecular weight, on the order of about 100,000) is essentially cellulose which has been carboxylated.

The present invention preferably uses "sodium" alginate having a molecular weight of about 12,000 to 80,000 and a typical degree of polymerization range of about 60 to 400. This range provides the desired bleed control of the inks.

The alginates most preferably employed in the practice of the invention are characterized by relatively low viscosity: a 1% solution in water yields a viscosity of 60 centipoise (cp), while a 2% solution in water yields a viscosity of 500 cp. Such material is commercially available from Aldrich Chemical Company (Milwaukee, WI).

The concentration of the alginate in the ink ranges from about 0.05 to 0.75 wt%, and is dependent on the particular type of amphoteric or non-ionic co-surfactant(s) employed. Such dependency is easily determined by means of print quality and ink rheology.

The co-surfactant is used for bleed alleviation, as described and claimed in application Serial No. 07/724,649, filed Jul. 2, 1991 by John R. Moffatt, entitled "Bleed Alleviation in Ink-Jet Inks", and assigned to the same assignee as the present application. Use of the colloids described above in conjunction with the surfactants of that application further improves the text print quality and renders the line definition sharper between colors printing adjacent one another.

The co-surfactant (typically, one or two may be employed) is a zwitterionic surfactant or a non-ionic amphiphile, such as an amine oxide. An example of bleed alleviating surfactant amphoteric molecules is an amine oxide, such as N,N-dimethyl-N-dodecyl amine oxide (NDAO), which has a $pk_a$ in water of about 2.3:

$$C_{12}H_{25}-N^+\begin{matrix}CH_3\\ \\CH_3\end{matrix}-O^-$$

This compound has a molecular weight of 229, and a critical micelle concentration (cmc; to be discussed in greater detail below) of 13 mM.

Also, in place of the $C_{12}H_{25}$- moiety, any R moiety may be used. The following moieties, their name, abbreviation, molecular weight (mw), and cmc are useful in the practice of the invention:

N,N-dimethyl-N-tetradecyl amine oxide (NTAO); mw=257; cmc=6-8 mM;

N,N-dimethyl-N-hexadecyl amine oxide (NHAO); mw=285; cmc=0.8 mM;

N,N-dimethyl-N-octadecyl amine oxide (NOAO); mw=313; cmc=small;

N,N-dimethyl-N-(Z-9-octadecenyl)-N-amine oxide (OOAO); mw=311; cmc=small.

Another example is N-dodecyl-N,N-dimethyl glycine:

$$C_{12}H_{25}-N^+\begin{matrix}CH_3\\ \\CH_3\end{matrix}-CH_2-COO^-$$

The SURFYNOLS, which are acetylenic polyethylene oxide surfactants, available from Air Products & Chemicals, Inc., are also useful in the practice of the invention and are represented as $$CH_3-CH-CH_2-\underset{\underset{[CH_2CH_2OH]_n}{|}}{C}-C\equiv C-\underset{\underset{[CH_2CH_2OH]_m}{|}}{C}-CH_2-CH-CH_3$$
$$\begin{matrix}|\\CH_3\end{matrix}\qquad\qquad\qquad\qquad\begin{matrix}|\\CH_3\end{matrix}$$

where n+m=0 to 50.

The preferred inks of the invention consist essentially of about 4 to 15 wt% 1,5-pentanediol; about 0.05 to 0.75 wt% sodium alginate; 0.1 to 5 wt% of at least one co-surfactant selected from the group consisting of an acetylenic polyethylene oxide, N,N-dimethyl-N-(Z-9-octadecenyl)-N-amine oxide, N,N-dimethyl-N-octadecyl amine oxide, cocobetaine, and sodium cholate; at least one of the dyes mentioned earlier, and the balance water.

EXAMPLES OF BLEED ALLEVIATING AMPHIPHILES

Several examples of inks are included in Table I below. The colors were simultaneously printed side by side using a dot-on-dot (double pass) algorithm. The dyes used were 1.33% C.I. Acid Red 52 (#45100); 1.65% C.I. Acid Blue (#42090); and 1.33% C.I. Direct Yellow 86 (#29325). SURFYNOL 465 and OOAO radically alter the extent of bleed, but it is not eliminated. Table I also shows the effect of increased sodium alginate concentrations which substantially eliminate bleed. The vehicles contained 0 to 15% of 1,5-pentanediol, with the balance of the ink containing water.

The color bleed index values listed in Table I are derived from the scale provided in FIG. 1, which is a print of lines of red (magenta) ink on a background of yellow ink. For high text quality output, a value of $\leq 2.5$ is considered to be acceptable. For somewhat lower quality demands, such as printing on boxes, plotting, and the like, a value of about 3 to 4 may be considered to be acceptable. Inks commonly used commercially presently have values, typically, of about 6 or more, which are unacceptable.

TABLE I

Bleed Indices of Various Inks.

| Example | Ink Component | Bleed Index |
|---|---|---|
| 1 | 8% pentanediol | >6 |
| 2 | 5.5% diethylene glycol | >6 |
| 3 | (a) + 0% sodium alginate | 4 |
| 4 | (a) + 0.05% sodium alginate | 5 |
| 5 | (a) + 0.10% sodium alginate | 4 |
| 6 | (a) + 0.15% sodium alginate | 3 |
| 7 | (a) + 0.20% sodium alginate | 2.5 |
| 8 | (a) + 0.25% sodium alginate | 2.5 |
| 9 | (a) + 0.30% sodium alginate | 2 |
| 10 | (a) + 0.25% sodium alginate + 1.5% Na$_4$EDTA | 4 |
| 11 | (a) + 0.25% sodium alginate + 1.5% Na$_4$EDTA + 12% NaCl | 4 |
| 12 | (b) + 0.25% sodium alginate | 2-2.5 |
| 13 | (b) + 0.25% potassium alginate | 4 |
| 14 | (a) + 0.25% sodium alginate + 1% Na$_3$-citrate | 3 |
| 15 | (b) + 0.25% sodium alginate + 1% Na$_3$-citrate | 5 |
| 16 | (a) + 0.25% lithium alginate | 4 |
| 17 | (a) + 0.25% sodium alginate + 2% NaBr | 4 |
| 18 | (a) + 0.25% sodium alginate + 0.5% Na$_4$B$_4$O$_7$.10H$_2$O | 4 |
| 19 | (a) + 0.25% sodium alginate + 2% sorbitol | 2 |
| 20 | (c) + 0.4% sodium alginate | 2 |
| 21 | (b) + 0.25% carrageenan | 2 |
| 22 | (b) + 0.25% carboxymethylcellulose | 5 |
| 23 | (b) + 0.25% carboxymethylcellulose + 0.5% CaCl$_2$ | 2.5-3 |
| 24 | (d) + 0.4% sodium alginate | 2 |

Notes:
(a) = 1.01% OOAO, 2% SURFYNOL 4.65, 8% 1,5-pentanediol
(b) = 1.01% OOAO, 0.5% sodium cholate, 8% 1,5-pentanediol
(c) = 1% NOAO; 0.5% sodium cholate; 8% 1,5-pentanediol
(d) = 1.5% cocobetaine (N-dodecyl-N,N-dimethyl-N-(ammonio ethyl carboxylate), (0.5% sodium cholate), 8% 1,5-pentanediol These results show that alginates (and the polysaccharides listed) exhibit concentrate dependence on efficient bleed alleviation. Concentration effects were observed in the case of non-ionic surfactants, such as n-butyl carbitol, n-butyl propasol, n-hexyl carbitol, amine oxides, and the SURFYNOL class of surfactants without alginate as well (not shown in Table I).

As to the presence of sorbitol, this is an additive for increasing the margin on crusting time. Its presence in Table I shows that polyols and other non-ionic additives do not have an adverse affect on color bleed.

Sodium cholate alleviates kogation in these inks, but its presence or absence in the ink has no effect on color bleed.

It is interesting to note common structural features among these bleed alleviating surfactants. All have features common among surfactants: long hydrocarbon (hydrophobic) tails with polar (hydrophilic) headgroups. Other such detergents of similar structures can be formulated in inks to solve bleed, provided they have structural features common to these. This does not imply that the bleed alleviating behavior is indigenous to all detergents.

Alginates and other listed polysaccharides have the characteristic property of aggregating polymeric strands of polysaccharides. Thus, it is plausible that large (at least about 1,000,000 in molecular weight) aggregates are formed having hydrophobic pockets which are capable of adsorbing dye. Noteworthy is the observation that effective bleed control is dependent on alginate concentration, as shown in Table I.

The detection of the cmc or the onset of micellization in an ink can be determined by a number of methods. Typically, sharp changes are seen in plots of surface tension vs. surfactant concentration (in the ink) or osmotic pressure vs. surfactant concentration (in the ink). These sharp changes are attributed to the cmc. Other methods, such as conductivity, turbidity, determination of equivalent conductance are precluded in water-soluble inks.

BLEED ALLEVIATION—POSSIBLE MECHANISMS

Figure 2:
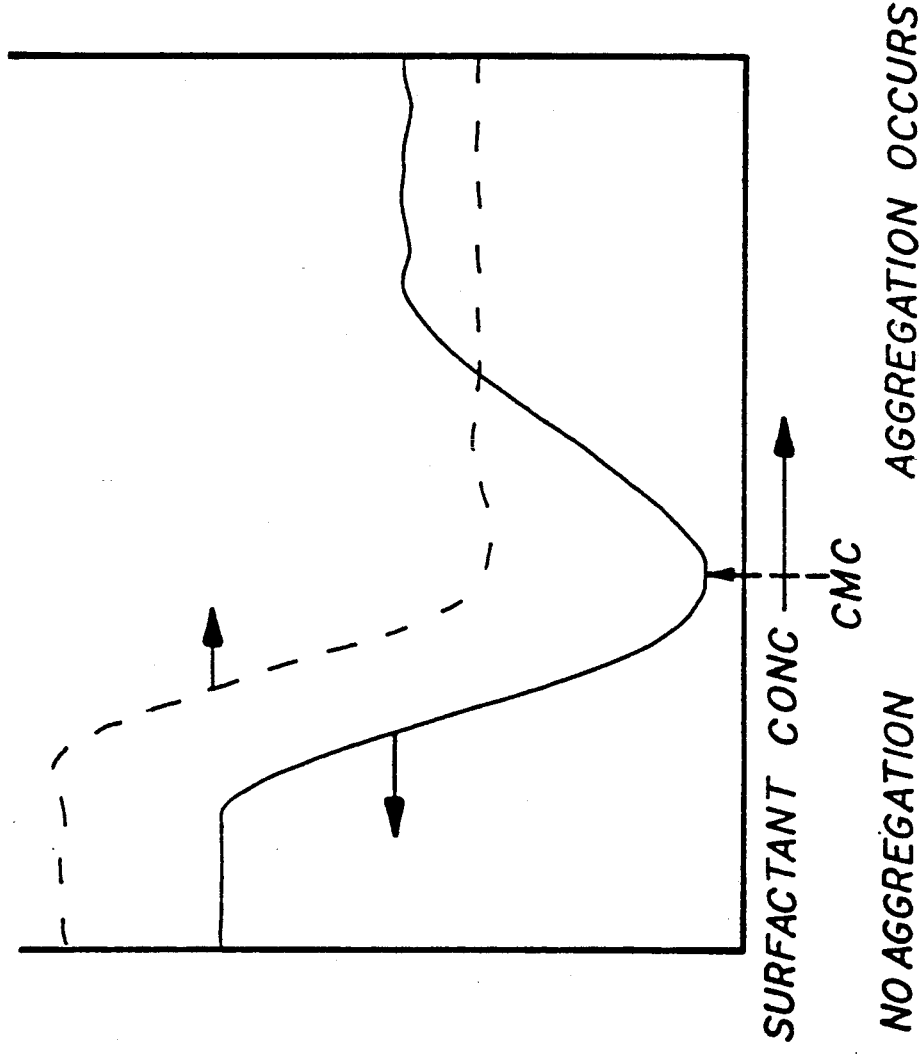
FIG. 2, on coordinates of text print quality (left abscissa) or bleed (right abscissa) and surfactant concentration, shows the qualitative effect on print quality and bleed as a function of concentration of a surfactant.

Reference to FIG. 2 gives a hypothetical concentration of surface-active reagent versus bleed and text print quality scale profiles. Basically, this FIG. profiles the bleed and text quality responses observed for all surfactants under investigation. FIG. 2 assumes that other components of the ink vehicle and dye(s) concentrations are fixed and that the surfactant concentration is the dependent variable. From FIG. 2, upon addition of a small amount of surfactant, there is little change in the bleed control and sharpness of the text print quality. With further additions of surfactant, degradation of text print quality results with little or no improvement (perhaps even a slight degradation in bleed alleviation occurs in some cases) in bleed. Surfactant concentrations are finally achieved where the quality of text begins to improve and bleed is reduced. Further decreases in bleed and improvement of text quality may occur with increasing concentration of surfactants in the ink.

The lowest concentration of surfactants where bleed alleviation and improvement of text print quality becomes appreciably effective is found to be near the critical micelle concentration (cmc) or critical monomer concentration of most colloid-forming species, including alginates and other polysaccharides. (The cmc is the concentration of colloidal species where simple electrolyte or non-electrolyte chemistry lessens in importance to colloid chemistry. For the amphoteric and non-ionic surfactants previously described, this is the concentration of surfactants where micelles, or aggregated surfactant molecules, begin to influence media chemistry.)

Micellization is driven by entropic constraints—the hydrocarbon moieties are driven into regions devoid of water and the hydrophilic, water-soluble groups interact in regions enriched with water. The resulting domainal fluid provides regions of water-poor and water-enriched pockets, which can compartmentalize organic solutes such as dyes, co-surfactants, and co-solvent molecules, depending on their hydrophobicity. In addition, micelles and colloids in general interact and find regions in solution where their positional (potential) energy is minimized. It is conceivable that colloids containing charged dye molecules behave in a similar fashion.

Incorporation of dyes into colloidal particles is the probable method by which surfactant-containing inks control bleed. Colloidal particles with dye of one color shot out of an ink-jet pen will not exchange dye of another color in an adjacent colloidal particle on the paper medium, because the rate at which the mobile medium evaporates or adsorbs into the paper is much faster than the desorption rate of the dye molecules from the colloid on the printing medium or the rate at which dye molecules diffuse through the colloidal medium. Bleed alleviation results.

Figure 3A:
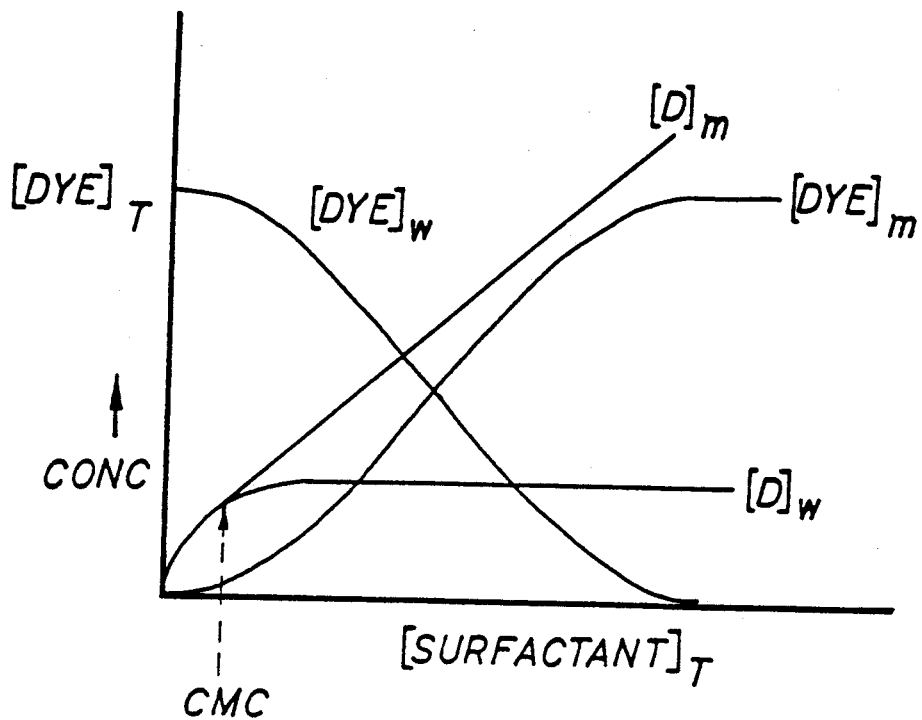
FIGS. 3a-b, on coordinates of dye concentration and total detergent (surfactant) concentration ($[D]_T$), are plots of dye adsorption to micelles, with FIG. 3a showing the effect of weak adsorption of dye to micelle and with FIG. 3b showing the effect of strong adsorption of dye to micelle, where $[D]_m$ is the detergent (surfactant) concentration in micelles and $[D]_w$ is the detergent (surfactant) concentration in water.
Figure 3B:
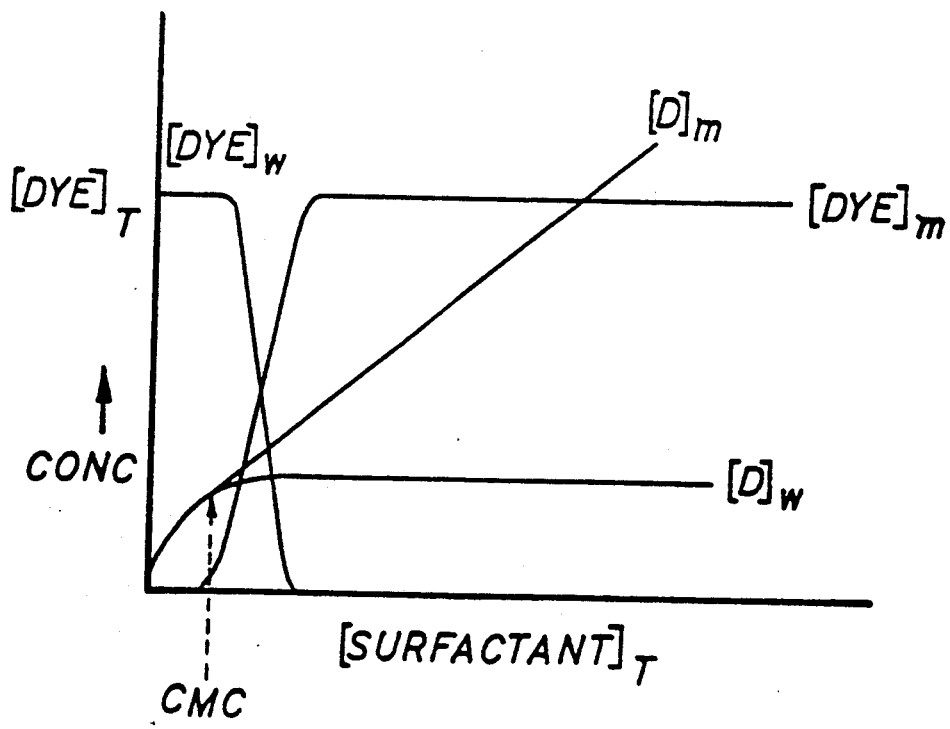

The efficiency of this bleed alleviation depends upon the level of adsorption of the dyes into the colloidal particles, the number concentration of colloidal particles in the ink, and the diffusion of dye and colloids on the paper surface. FIGS. 3a and 3b show hypothetically the extent of adsorption of dye into colloid particles as a function of surfactant concentration for dye molecules that strongly adsorb to the colloid particles (FIG. 3b) and for dye molecules that weakly adsorb (FIG. 3a). It will be noted that in the weakly adsorbing dye, a much higher surfactant concentration is necessary to bind the same amount of dye than in the case of the strongly adsorbing dye. Obviously, the propensity for dye to adsorb to colloids is a function of the structure (hydrophobicity) and interactions of the dye molecule, the surfactants, co-solvent, and co-surfactants (if any) present.

Alginates (and the other polysaccharides listed as well) are highly efficient at controlling bleed. Although use of surfactants such as OOAO and SURFYNOL 465 alleviate bleed over organic solvent alone (such as 1,5-pentanediol and diethylene glycol), further improvement occurs upon addition of sodium alginate. Large molecular weight polysaccharides should adsorb dye molecules in their hydrophobic pockets. These large molecular complexes have small diffusion coefficients and should migrate slowing in (or on) print media. Thus, aggregating polysaccharides should enhance the bleed control afforded by smaller micellar-forming surfactants such as OOAO and NOAO, as shown in Table I.

It is noteworthy that low molecular weight carboxymethylcellulose with OOAO, sodium chloate, and 8% pentanediol is ineffective at controlling bleed (bleed index > 5), but upon a small addition of calcium ion is very capable of controlling bleed. Divalent cations are extremely efficient at promoting micellization and calcium ion probably promotes micellization of carboxymethylcellulose. The medium and high viscosity grades of carboxymethylcellulose are precluded from ink-jet use because of nozzle clogging.

The presence of calcium ion is a necessary ingredient in controlling bleed. Table I shows that small concentrations of EDTA or citrate ions (in either a vehicle containing NOAO or OOAO) exacerbate bleed. Presumably, EDTA (and citrate) removes calcium ion from its important role in participating in the formation of large alginate complexes by chelating it. The formation constants for the EDTA-calcium ion and citrate-calcium ion complexes are very large. At least about 4 ppm $Ca^{+2}$ is required for efficient bleed control.

Also noteworthy is that added salt (NaCl) and sodium tetraborate decahydrate adversely interfere with the bleed controlling properties of alginate. On the other hand, the presence of sodium cholate, for controlling kogation, appears to have no adverse affect on color bleed.

INDUSTRIAL APPLICABILITY

The ink compositions of the invention are expected to find use in thermal ink-jet inks, especially color inks, where bleed of one color into another is a concern. The ink compositions of the invention reduce or even eliminate such color bleed.

What Is claimed Is:

1. A process for controlling color bleed in inks employed in thermal ink-jet printing, comprising printing on a medium with an ink having the following composition:
   (a) a vehicle comprising (1) about 0.05 to 0.75 wt% of a high molecular weight colloid having a molecular weight of at least about 10,000, (2) at least one member selected from the group consisting of zwitterionic surfactants and non-ionic amphiphiles, present in an amount that is at least equal to its critical micelle concentration, and (3) about 0.5 to 20 wt% of at least one organic solvent which supports the micelle formation of said at least one member;
   (b) about 0.1 to 10 wt% of at least one water-soluble dye dissolved therein; and
   (c) the balance water.

2. The process of claim 1 wherein said high molecular weight colloid is selected from the group consisting of alginic acid, mannomuronic acid, carrageenan, guar and xanthan gums, dextran, chitin, chitosan, and carboxymethylcellulose.

3. The process of claim 2 wherein said alginic acid is present as a salt thereof, having a molecular weight of about 12,000 to 80,000.

4. The process of claim 2 wherein said carrageenan has a molecular weight ranging from about 300,000 to 500,000.

5. The process of claim 2 wherein said carboxymethylcellulose comprises a low molecular weight form of carboxylated cellulose, having a molecular weight of about 100,000.

6. The process of claim 1 wherein said amphoteric surfactants are pH-sensitive surfactants selected from the group consisting of N,N-dimethyl-N-dodecyl amine oxide, N,N-dimethyl-N-tetradecyl amine oxide, N,N-dimethyl-N-hexadecyl amine oxide, N,N-dimethyl-N-octadecyl amine oxide, N,N-dimethyl-N-(Z-9-octadecenyl)-N-amine oxide, N-dodecyl-N,N-dimethyl glycine.

7. The process of claim 1 wherein said organic solvent is selected from the group consisting of glycols, diols, glycol esters, glycol ethers, long chain alcohols, sulfolane, esters, ketones, lactones, and glycerols, and derivatives thereof and mixtures thereof.

8. The process of claim 7 wherein said solvent is selected from the group consisting of ethylene glycol, diethylene glycol, triethylene glycol, tetraethylene glycol, propylene glycol, polyethylene glycol, polypropylene glycol, and derivatives thereof; butanediol, pentanediol, hexanediol, and homologous diols; propylene glycol laurate; ethylene glycol monobutyl ether, diethylene glycol mono ethyl ether, diethylene glycol mono butyl ether, diethylene glycol mono hexyl ether, propylene glycol ether, dipropylene glycol ether, and triethylene glycol ether; butyl alcohol, pentyl alcohol, and homologous alcohols; γ-butyrolactone, N-pyrrolidone and N-(2-hydroxyethyl)pyrrolidone, and glycerols and their derivatives.

9. The process of claim 1 wherein said dye is a water-soluble anionic dye selected from the group consisting of C.I. Acid Blue 9, C.I. Acid Red 18, C.I. Acid Red 27, C.I. Acid Red 52, C.I. Acid Yellow 23, C.I. Direct Blue 199, and C.I. Direct Yellow 86.

10. The process of claim 9 wherein said anionic dye is associated with a cation selected from the group consisting of monovalent alkali earth ions, $NH°-$, and substituted ammonium salts.

11. The process of claim 1 wherein said ink consists essentially of:
   (a) about 4 to 15 wt% 1,5-pentanediol;
   (b) about 0.05 to 0.75 wt% sodium alginate;
   (c) 0.1 to 5 wt% of at least one co-surfactant selected from the group consisting of an acetylenic polyethylene oxide, N,N-dimethyl-N-(Z-9-octadecenyl)-N-amine oxide, N,N-dimethyl-N-octadecyl amine oxide, cocobetaine, and sodium cholate;
   (d) said at least one water-soluble dye; and
   (e) the balance water.

12. The process of claim 1 wherein said composition further includes at least about 4 ppm of $Ca^{+2}$ ion.

13. A thermal ink-jet ink having the following composition:
   (a) a vehicle comprising (1) about 0.05 to 0.75 wt% of a high molecular weight colloid having a molecular weight of at least about 10,000, (2) at least one member selected from the group consisting of zwitterionic surfactants and non-ionic amphiphiles, present in an amount that is at least equal to its critical micelle concentration, and (3) about 0.5 to 20 wt% of at least one organic solvent which supports the micelle formation of said at least one member;
   (b) about 0.1 to 10 wt% of at least one water-soluble dye dissolved therein; and
   (c) the balance water.

14. The ink of claim 13 wherein said high molecular weight colloid is selected from the group consisting of alginic acid, mannomuronic acid, carrageenan, guar and xanthan gums, dextran, chitin, chitosan, and carboxymethylcellulose.

15. The ink of claim 14 wherein said alginic acid is present as a salt thereof, having a molecular weight of about 12,000 to 80,000.

16. The ink of claim 14 wherein said carrageenan has a molecular weight ranging from about 300,000 to 500,000.

17. The ink of claim 14 wherein said carboxymethylcellulose comprises a low molecular weight form of carboxylated cellulose, having a molecular weight of about 100,000.

18. The ink of claim 13 wherein said amphoteric surfactants are pH-sensitive surfactants selected from the group consisting of N,N-dimethyl-N-dodecyl amine oxide, N,N-dimethyl-N-tetradecyl amine oxide, N,N-dimethyl-N-hexadecyl amine oxide, N,N-dimethyl-N-octadecyl amine oxide, N,N-dimethyl-N-(Z-9-octadecenyl)-N-amine oxide, N-dodecyl-N,N-dimethyl glycine.

19. The ink of claim 13 wherein said organic solvent is selected from the group consisting of glycols, diols, glycol esters, glycol ethers, long chain alcohols, esters, sulfolane, esters, ketones, lactones, and glycerols, and derivatives thereof and mixtures thereof.

20. The ink of claim 19 wherein said solvent is selected from the group consisting of ethylene glycol, diethylene glycol, triethylene glycol, tetraethylene glycol, propylene glycol, polyethylene glycol, polypropylene glycol, and derivatives thereof; butanediol, pentanediol, hexanediol, and homologous diols; propylene glycol laurate; ethylene glycol monobutyl ether, diethylene glycol mono ethyl ether, diethylene glycol mono butyl ether, diethylene glycol mono hexyl ether, propylene glycol ether, dipropylene glycol ether, and triethylene glycol ether; butyl alcohol, pentyl alcohol, and homologous alcohols; γ-butyrolactone, N-pyrrolidone and N-(2-hydroxyethyl)pyrrolidone, and glycerols and their derivatives.

21. The ink of claim 13 wherein said dye is a water-soluble anionic dye selected from the group consisting of C.I. Acid Blue 9, C.I. Acid Red 18, C.I. Acid Red 27, C.I. Acid Red 52, C.I. Acid Yellow 23, C.I. Direct Blue 199, and C.I. Direct Yellow 86.

22. The ink of claim 21 wherein said anionic dye is associated with a cation selected from the group consisting of monovalent alkali earth ions, $NH_4^{30}$, and substituted ammonium salts.

23. The ink of claim 13 wherein said ink consists essentially of:
   (a) about 4 to 15 wt% 1,5-pentanediol;
   (b) about 0.05 to 0.75 wt% sodium alginate;
   (c) 0.1 to 5 wt% of at least one co-surfactant selected from the group consisting of an acetylenic polyethylene oxide, N,N-dimethyl-N-(Z-9-octadecenyl)-N-amine oxide, N,N-dimethyl-N-octadecyl amine oxide, cocobetaine, and sodium cholate;
   (d) said at least one water-soluble dye; and
   (e) the balance water.

24. The ink of claim 23 wherein said ink consists essentially of:
   (a) about 8 wt% 1,5-pentanediol;
   (b) about 0.25 wt% sodium alginate;
   (c) about 2 wt% of an acetylenic polyethylene oxide surfactant;
   (d) about 1 to 3 wt% N,N-dimethyl-N-octadecyl amine oxide;
   (e) said at least one water-soluble dye; and
   (f) the balance water.

25. The ink of claim 23 wherein said ink consists essentially of:
   (a) about 8 wt% 1,5-pentanediol;
   (b) about 0.25 wt% sodium alginate;
   (c) about 1 wt% N,N-dimethyl-N-octadecyl amine oxide;
   (d) about 0.5 wt% sodium cholate;
   (e) said at least one water-soluble dye; and
   (f) the balance water.

26. The ink of claim 23 wherein said ink consists essentially of:
   (a) about 8 wt% 1,5-pentanediol;
   (b) about 0.4 wt% sodium alginate;
   (c) about 1 wt% N,N-dimethyl-N-(Z-9-octadecenyl)-N-amine oxide;
   (d) said at least one water-soluble dye; and
   (e) the balance water.

27. The ink of claim 23 wherein said ink consists essentially of:
   (a) about 8 wt% 1,5-pentanediol;
   (b) about 0.4 wt% sodium alginate;
   (c) about 1 wt% N,N-dimethyl-N-(Z-9-octadecenyl)-N-amine oxide;
   (d) about 0.5 wt% sodium cholate;
   (e) said at least one water-soluble dye; and
   (f) the balance water.

28. The ink of claim 23 wherein said ink consists essentially of:
   (a) about 8 wt% 1,5-pentanediol;
   (b) about 0.4 wt% sodium alginate;
   (c) about 1.5 wt% cocobetaine;
   (d) said at least one water-soluble dye; and
   (e) the balance water.

29. The ink of claim 23 wherein said ink consists essentially of:
   (a) about 8 wt% 1,5-pentanediol;
   (b) about 0.4 wt% sodium alginate;
   (c) about 1.5 wt% cocobetaine;
   (d) about 0.5 wt% sodium cholate;
   (e) said at least one water-soluble dye; and
   (f) the balance water.

30. The ink of claim 13 further including at least about 4 ppm $Ca^{+2}$ ion.

* * * * *